United States Patent

[11] 3,590,386

[72] Inventors Felix Daniel Tisi
Zurich, Switzerland;
Frank De Jager, Emmasingel, Eindhoven, Netherlands

[21] Appl. No. 863,126
[22] Filed Oct. 2, 1969
[45] Patented June 29, 1971
[73] Assignee U.S. Philips Corporation
New York, N.Y.
[32] Priority Oct. 2, 1968
[33] Netherlands
[31] 6814125

[54] RECEIVER FOR THE RECEPTION OF INFORMATION PULSE SIGNALS LOCATED IN A PRESCRIBED TRANSMISSION BAND
5 Claims, 19 Drawing Figs.

[52] U.S. Cl. .......... 325/321, 178/68, 325/38 R, 325/38 A, 325/322, 325/419
[51] Int. Cl. .......... H04b 1/16, H03k 9/02
[50] Field of Search .......... 325/38, 38 A, 321, 322, 325, 419; 178/68, 69.5 R; 328/155, 162

[56] References Cited
UNITED STATES PATENTS
3,459,892 8/1969 Shagena .......... 178/68

*Primary Examiner*—Robert L. Griffin
*Assistant Examiner*—Kenneth W. Weinstein
*Attorney*—Frank R. Trifari ABSTRACT: A receiver for the reception of synchronous information pulse signals provided with a detection device from which a multilevel information pulse signal can be derived, and a local clock pulse generator, and a clock frequency extractor for recovering the clock frequency for synchronizing the local clock pulse generator.

In order to recover the clock frequency in its proper phase from the received information pulse signals themselves, a multilevel information pulse signal derived from the detection device is applied according to the invention to a frequency selective circuit included in the clock frequency extractor which circuit is tuned to half the clock frequency and whose output is connected to a nonlinear circuit acting as a frequency doubler which is connected through a normally open electronic switch to the phase-synchronizing circuit of the local clock pulse generator, the electronic switch being controlled by a control circuit including a threshold device to which a signal derived from the frequency selective circuit a applied to produce a control signal for closing the electronic switch when said derived signal exceeds the threshold value of said threshold device.

INVENTORS
FELIX D. TISI
FRANK DE JAGER
BY
AGENT

INVENTORS
FELIX D. TISI
FRANK DE JAGER
BY
Frank R. Trifari
AGENT

INVENTORS
FELIX D. TISI
FRANK DE JAGER
BY
Frank R. Jafari
AGENT

INVENTORS
FELIX D. TISI
FRANK DE JAGER
BY
AGENT

RECEIVER FOR THE RECEPTION OF INFORMATION PULSE SIGNALS LOCATED IN A PRESCRIBED TRANSMISSION BAND

The invention relates to a receiver for the reception of information pulse signals located in a prescribed transmission band, the original information pulses of which coincide with different pulses of a series of equidistant clock pulses, the receiver comprising a detection device from which a multilevel information pulse signal can be derived, and a pulse regenerator controlled by a local clock pulse generator for regenerating the detected information pulses as to shape and instant of occurrence, and a clock frequency extractor for recovering the clock frequency which is applied to a phase-synchronizing circuit of the local clock pulse generator.

Such receivers are used in different methods of transmission of the information pulse signals both in case of a direct transmission of multilevel information pulse signals and in case of a transmission by using modulation, for example, amplitude modulation or multiphase modulation; the detection device being adapted to the method of transmission used.

In receivers in which a binary information pulse signal is derived from the detection device the overall transmission characteristic of transmitter-transmission path-receiver can be adjusted in accordance with a known Nyquist criterion for maintaining the original location of the zero crossings in the detected information signal so that this correct location of the zero crossings permits recovering the clock frequency at the receiver end in its proper phase. Such an adjustment, however, is not possible in receivers in which multilevel information pulse signals may occur at the output of the detection device so that in that case special steps are required for recovering the clock frequency in its proper phase, such as transmitting the clock frequency from the transmitter to the receiver either through a separate connection or adding a pilot signal to the information pulse signals to be transmitted.

It is an object of the invention to provide a receiver of the type described in the preamble in which in a simple manner the clock frequency can be recovered in its proper phase from the received information pulse signals themselves.

The receiver according to the invention is characterized in that for recovering the clock frequency from the received information pulse signals *a* in its proper phase multilevel information pulse signal derived from the detection device is applied to a frequency selective circuit incorporated in the clock-frequency extractor, which circuit is tuned to half the clock frequency and whose output is connected to a nonlinear circuit acting as a frequency doubler which is connected through a normally open electronic switch to the phases-synchronizing circuit of the local clock pulse generator, said electronic switch being controlled by a control circuit including a threshold device to which a signal derived from said frequency selective circuit is applied to produce a control signal for closing the electronic switch when said derived signal exceeds the threshold value of said threshold device.

In order that the invention may be readily carried into effect, a few embodiments thereof will now be described in detail, by way of example with reference to the accompanying diagrammatic drawings in which:

FIG. 1 shows a receiver according to the invention which is adapted to receive synchronous four-level information pulse signals transmitted by using amplitude modulation, the original information pulses coinciding with different pulses of a series of equidistant clock pulses of a clock frequency $f_b$ of, for example, 5 kHz. and the carrier frequency $f_c$ being, for example, 20 kHz.

Figure 1:
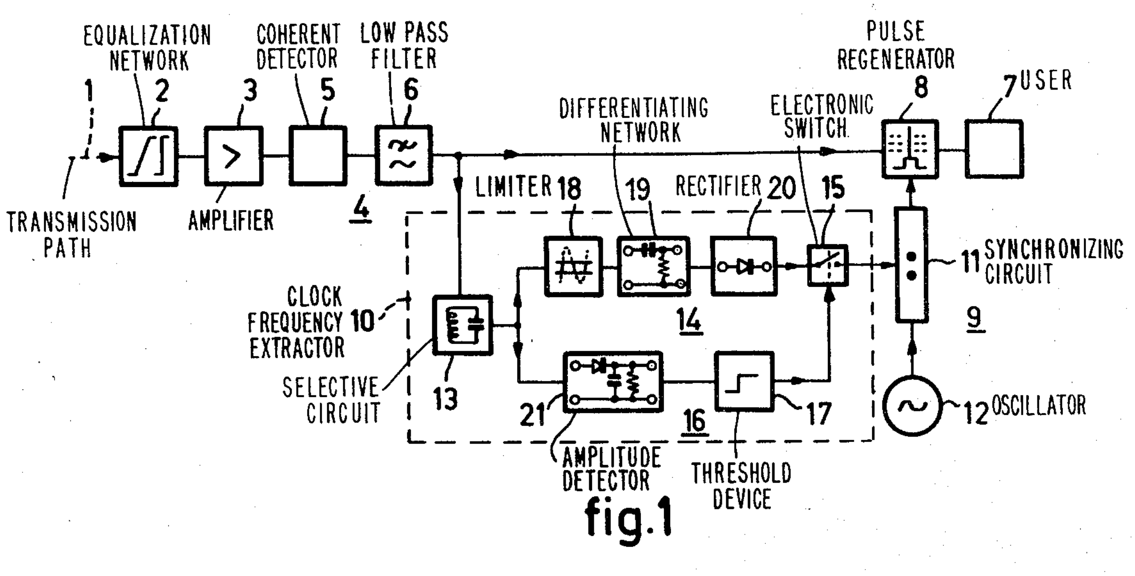
FIG. 1 shows a receiver according to the invention, while FIGS. 2*a*, 2*b*, 2*c*, 3through 3*h*, 4*a* through 4*d* show a few time diagrams to explain the operation of the receiver according to FIG. 1.

In the receiver shown the information pulse signals derived from transmission path 1 and located in a transmission band of from 17—23 kHz. are applied through an equalizing network 2 for equalization of the said transmission band and an input amplifier 3 to an amplitude detection device 4 in the form of a coherent detector 5 and a subsequent low-pass filter 6 having a cutoff frequency of, for example, 3 kHz. The four-level information pulse signal derived from the detection device 4 is applied prior to its further handling in a user 7, to a pulse regenerator 8 which is controlled by a local clock pulse generator 9.

The pulse regenerator 8 shown is formed in known manner as an amplitude discriminator having three slicers whose threshold values are adjusted substantially centrally between adjacent pairs of the four possible levels of the detected four-level information pulse signal. Each slicer is connected to a sampler which samples the output signal from this slicer under the control of sampling pulses having a clock frequency $f_b$. The samples thus obtained are applied to pulse shapes, while all pulse shapers are connected to a combination device which applies information pulses thus regenerated as to shape and instant of occurrence to the user 7.

The local clock pulse generator 9 is synchronized with the clock frequency at the transmitter end. In contrast with the situation in a receiver in which a binary information pulse signal is derived from the detection device, the receiver of FIG. 1 in which a four-level information pulse signal having, for example, the shape shown at *a* in FIG. 2 occurs at the output of the detection device 4 does not permit the overall transmission characteristic of transmitter-transmission path-receiver to be adjusted in such a manner that the clock frequency can be recovered from the zero crossings of this four-level information pulse signal, since a great part of these zero crossings still does not coincide with a series of equidistant pulses of clock frequency shown at *c* in FIG. 2 as is apparent from the location of the zero crossings of this information pulse signal shown at *b* in FIG. 2. Special steps are then required for recovering the clock frequency in the receiver in its proper phase. So, the synchronization of the local clock pulse generator 9 can be effected by transmitting the clock frequency with the aid of a pilot signal or by means of another known method, for example, through a separate transmission path from transmitter to receiver and by recovering this clock frequency with the aid of a clock-frequency extractor 10, for example, in the form of a pilot filter, and by subsequently applying the recovered clock frequency to a phase-synchronizing circuit 11 of the local clock pulse generator 9.

In the receiver shown the local clock pulse generator 9 is constituted by a free running generator in the form of a stable oscillator 12 of high frequency, for example, a frequency $64f_b$=320 kHz, succeeded by the phase-synchronizing circuit 11 in the form of a digital divider having a division factor of 64, the phase synchronization being effected by applying pulses derived from the recovered clock frequency $f_b$ as reset pulses to the divider so as to reset it every time to its initial position.

To recover the clock frequency in its proper phase from the received information pulse signals themselves in the receiver described thus far, a multilevel information pulse signal derived from the detection device 4 is applied, according to the invention, to a frequency selective circuit 13 incorporated in the clock frequency extractor 10, which circuit is tuned to half the clock frequency and whose output is connected to a nonlinear circuit 14 acting as a frequency doubler which is connected through a normally open electronic switch 15 to the phase-synchronizing circuit 11 of the local clock pulse generator 9, said electronic switch 15 being controlled by a control circuit 16 including a threshold device 17 to which a signal derived from the frequency selective circuit 13 is applied to produce a control signal for closing the electronic switch 15 when its said derived signal exceeds the threshold value of said threshold device 17.

In the embodiment shown the frequency selective circuit 13 is, for example, formed by a resonant circuit tuned to half the clock frequency $f_b/2$, while the nonlinear circuit 14 is formed by a double-acting limiter or slicer 18 the slicing threshold of which is set at zero level, succeeded by a differentiating network 19 for the limited selected signal of half the clock frequency $f_b/2$ and a full-wave rectifier 20 the output of which is connected to the electronic switch 15. Furthermore the control circuit 16 is formed by an amplitude detector 21, for example, an envelope detector for the selected signal of half the clock frequency $f_b/2$, succeeded by the threshold device 17 which is likewise formed as, for example, a slicer the slicing threshold of which is adjusted at a suitably chosen level.

The clock frequency extraction in the receiver according to the invention will now be considered with reference to the time diagrams of FIG. 3.

If, for example, the four-level information pulse signal shown at $a$ (compare $a$ in FIG. 2) appears at the output of the detection device 4, the signal of half the clock frequency $f_b/2$ shown at $b$ is produced at the output of the frequency selective circuit 13, the amplitude of said signal varying as a function of the information pulse signal $a$. When this selected signal $b$ is applied to the nonlinear circuit 14 the substantially rectangular signal $c$ is produced by the double-acting limiter or slicer 18. By differentiation of this limited signal $c$ in the differentiating network 19 the pulse series $d$ is obtained which is composed of sharp needle pulses which coincide with the zero crossings in the selected signal $b$ of half the clock frequency $f_b/2$. After full-wave rectification of this pulse series $d$ in the rectifier 20, the pulse series $e$ occurs at the input of the electronic switch 15 in which series the needle pulses occur at twice the frequency of the pulse series $d$ as a result of the frequency doubling action of this rectifier 20. To control the switch 15 the selected signal $b$ is also applied to the amplitude detector 21 in the control circuit 16 in which the envelope $f$ of this selected signal $b$ is obtained which is applied to the threshold device 17 to produce a control signal $g$ for closing the electronic switch 15 when the threshold value of threshold device 17 is exceeded (shown in a broken line at $f$ in FIG. 3), so that the pulse series $h$ is produced at the output of this switch 15, in which series all needle pulses occur in the rhythm of the clock frequency $f_b$. The pulses of this pulse series $h$ are now applied as synchronizing pulses to the phase-synchronizing circuit 11 of the local clock pulse generator 9 so as to reset the divider therein every time to its initial position, as described in the foregoing.

The synchronization obtained in this manner is very reliable because the needle pulse of the pulse series $e$ which coincide with the zero crossings of the selected signal $b$ are utilized as synchronizing pulses (pulse series $h$) only when the amplitude of this selected signal $b$ is sufficiently large so that the influence of interference, for example noise, on the location of the zero crossing $a$ of this selected signal $b$ is then comparatively small and in addition accidental zero crossings caused by the occasional decrease to zero of the amplitude of this selected signal $b$ have no influence on the synchronization.

Thus both a reliable and an accurate phase synchronization of the local clock pulse generator 9 in the receiver shown is achieved with the aid of a series of pulses of clock frequency recovered from the received information pulse signals themselves as has been shown by experiments and as will now be further described with reference to the time diagrams of FIG. 4.

Figures 4A, 4B, 4C:
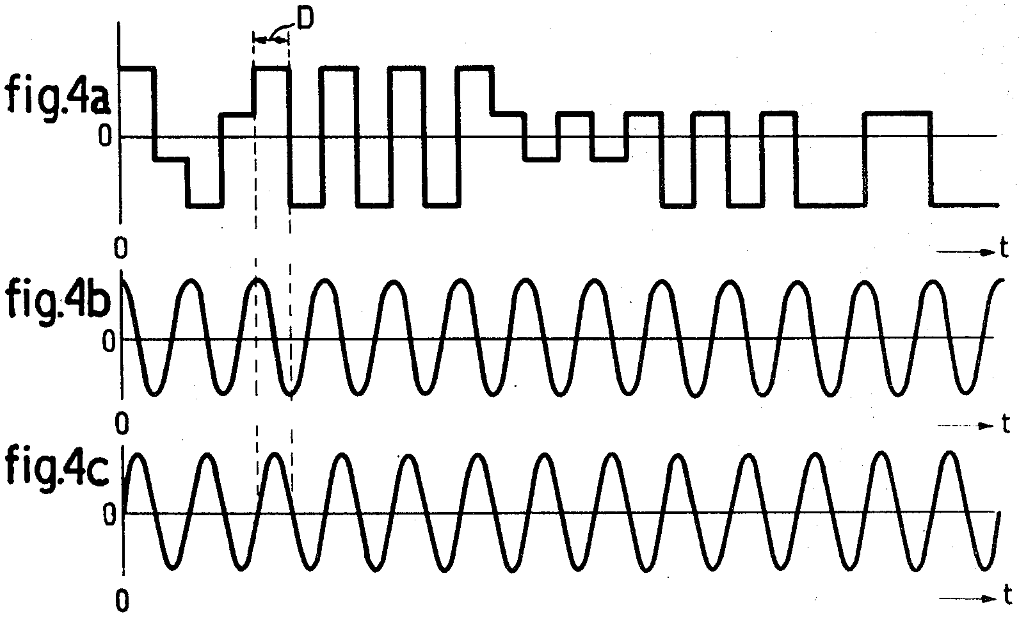
Figure 4D:
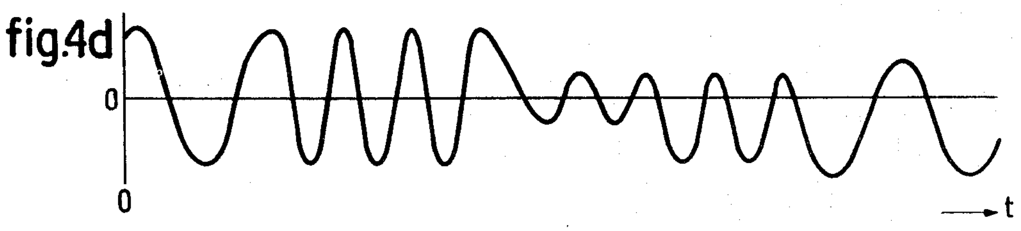

The starting point for the description is the original four-level information pulse signal $p(t)$ at the transmitter end which is shown as a function of time $t$ at $a$ in FIG. 4 and which is composed of synchronous information pulses having different amplitudes, but mutually equal duration $D=1/f_b$. A given component of radial frequency $\omega=2\pi f$ occurs in such an information pulse signal $p(t)$ in the shape of:

$$c(t).\cos\omega t+s(t).\sin\omega t \qquad (1)$$

wherein as is known the coefficients $c(t)$ and $s(t)$ can be determined with the aid of the integrals:

$$c(t)=\frac{2}{T}\int_{t-T}^{t}p(\tau)\cdot\cos\omega\tau\cdot d\tau \qquad (2)$$

$$s(t)=\frac{2}{T}\int_{t-T}^{t}p(\tau)\cdot\sin\omega\tau\cdot d\tau \qquad (3)$$

wherein the magnitude of the integration interval $T$ is equal to one or more periods of the radial frequency $\omega$. The amplitude and the phase of the relevant component of radial frequency $\omega$ which are determined by these coefficients $c(t)$ and $s(t)$ thus generally depend on the variation of the information pulse signal $p(t)$ as a function of the time $t$.

However, for a component of half the clock frequency $f_b/2$, hence at a radial frequency $\omega=\pi/D$, and for the choice of the original $t=0$ made in $a$, it appears that integration over an interval $(k_1D, k_2D)$ wherein $k_1$ and $k_2$ are integers always provides a value equal to zero for the integral $c(t)$ according to (2), but for the integral $s(t)$ according to (3) it may provide a value differing from zero. This can be illustrated in a simple manner with the aid of the functions cos $(\pi t/D)$ and sin $(\pi t/D)$ shown in FIG. 4 at $b$ and $c$, respectively, for the radial frequency $\omega=\pi/D$, where it may be apparent from the Figure that the mean value of the product $p(t)$. cos $(\pi t/D)$ over an arbitrary interval $(k_1D, (k_1+1)D)$ of magnitude D has the value of zero, while the product $p(t)$. sin $(\pi t/D)$ may assume a mean value differing from zero.

The foregoing means that the component of half the clock frequency $f_b/2$, hence of radial frequency $\omega=\pi/D$ only occurs as $$s(t).\sin\omega t=s(t).\sin(\pi t/D) \qquad (4)$$

so that apart from the sign of the coefficient $s(t)$, the phase of the component of half the clock frequency $f_b/2$ is independent of the variation of the information pulse signal $p(t)$. It follows that the location of the zero crossings of this signal of half the clock frequency $f_b/2$ is also independent of the variation of the information pulse signal $p(t)$ as far as the zero crossings are not caused by the coefficient $s(t)$ becoming zero.

If the information pulse signal $p(t)$ shown at $a$ in FIG. 4 wherein, as has been proved, a component present at half the clock frequency $f_b/2$ has the property that the location of the zero crossings is independent of the variation of the information pulse signal $p(t)$, is transmitted with the aid of the transmitter through the transmission path 1 to the receiver, then the information pulse signal shown at $d$ (compare $a$ in FIGS. 2 and 3) is produced at the output of the detection device 4 which signal is limited in bandwidth but in which the component of half the clock frequency $f_b/2$ is present with unchanged properties. Particularly this component occurs in the information pulse signal $d$ in the shape of:

$$As(t)\cdot\sin[(\pi t/D)+\rho] \qquad (5)$$

wherein the factor $A$ and the phase shift $\Phi$ are given constants due to the overall transmission characteristic of transmitter-transmission path-receiver for half the clock frequency $f_b/2$ which constants do not depend on the variation of the information pulse signal. Thus, the location of the zero crossings of the component of half the clock frequency $f_b/2$ is invariant in linear transmission as to the variation of the information pulse signal.

Selection of this component of half the clock frequency $f_b/2$ in the selective circuit 13 and further use of the steps already extensively described then produces the pulse series shown at $h$ in FIG. 3 wherein all needle pulses coincide with zero crossings of the selected components of half the clock frequency $f_b/2$ and occur in the rhythm of the clock frequency $f_b$ without their location being influenced by the variation of the information pulse signal.

In this manner a particularly reliable and accurate phase synchronization of the local clock pulse generator is effected by using the steps according to the invention and with the aid of a clock frequency which has been recovered in its proper phase from the received information pulse signals and in which undesired influence of the phase synchronization by the information pulse signals is completely avoided.

Figures 2A, 2B, 2C:
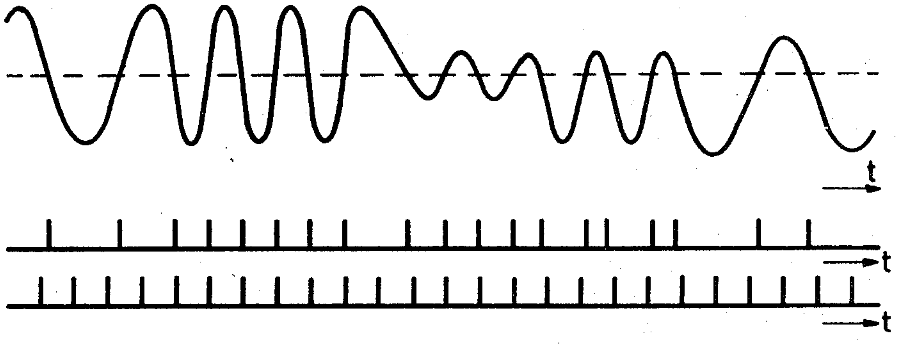
Figure 3A:
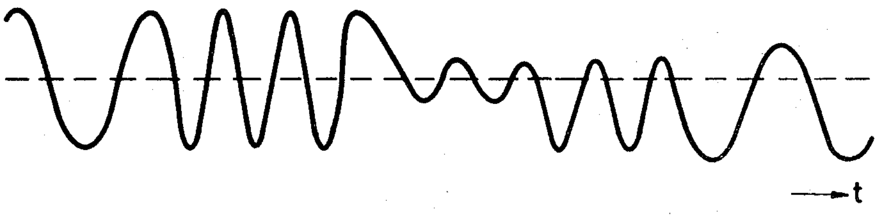
Figure 3B:
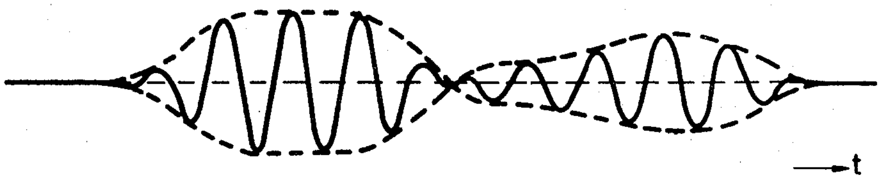
Figure 3C:
Figure 3D:
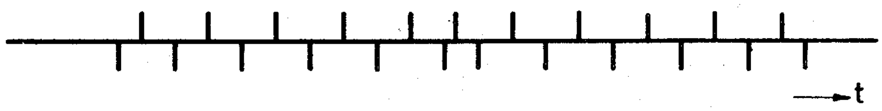
Figure 3E:
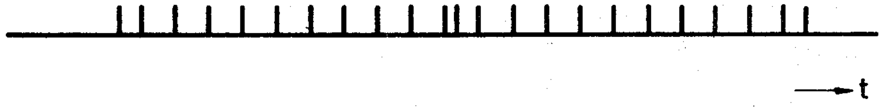
Figure 3F:
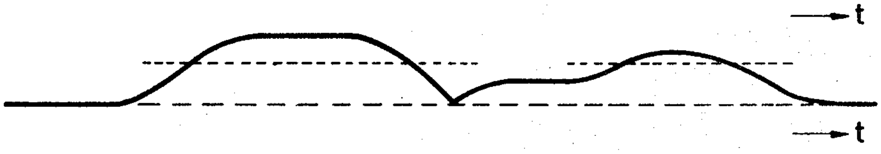
Figure 3G:
Figure 3H:
Figure 5:
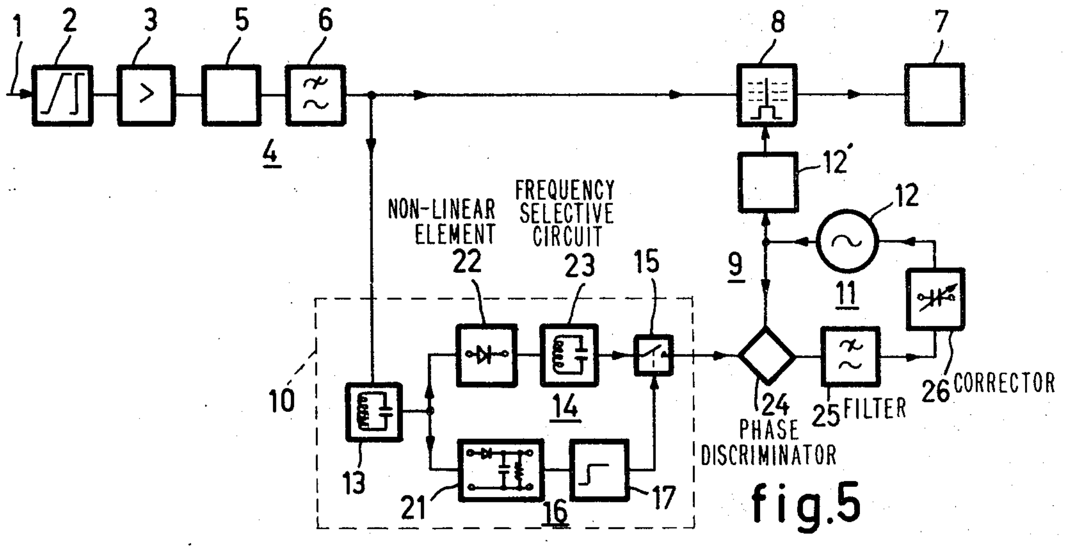
FIG. 5 shows a modification of the receiver in FIG. 1.

FIG. 5 shows a modification of the receiver of FIG. 1, in which elements corresponding to those in FIG. 1 have the same reference numerals in FIG. 5. The receiver of FIG. 5 differs from that of FIG. 1 as regards the construction of the nonlinear circuit 14 in the clock frequency extractor 10 and the local clock pulse generator 9.

The nonlinear circuit 14 in FIG. 5 comprises a nonlinear element 22 connected to the output of the selective circuit 13, which element is formed, for example, by a full-wave rectifier, the output-versus-input characteristic of which has a quadratic term, with the aid of which nonlinear element 22 the signal of half the clock frequency $f_b/2$ selected in the frequency selective circuit 13 is doubled in frequency, undesired frequency components being eliminated in a frequency selective circuit 23, for example, a resonant circuit tuned to the clock frequency $f_b$, whereafter the frequency-doubled signal is applied to the electronic switch 15. As in FIG. 1, the switch 15 is also closed by the control circuit 16 in case of a sufficiently large amplitude of the selected signal of half the clock frequency $f_b/2$ and the signal of clock frequency $f_b$ obtained in the nonlinear circuit 14 acting as a frequency doubler is applied to the phase-synchronizing circuit 11 of the local clock pulse generator 9.

The local clock pulse generator 9 also includes a stable oscillator 12, but now having a clock frequency $f_b$ which oscillator 12 is connected through a pulse shaper 12' to the pulse regenerator 8 so as to obtain short sampling pulses, while the phase-synchronizing circuit 11 includes a phase discriminator 24 to which the clock frequency extractor 10 is connected to the one hand and the oscillator 12 on the other hand, while the output of the phase discriminator 24 is connected to a smoothing filter 25 the smoothed output signal of which is applied as a control signal to a frequency corrector 26, for example, formed as a variable reactance for automatic phase synchronization of the oscillator 12 on the signal of clock frequency $f_b$ recovered from the frequency extractor 10.

The operation of the receiver of FIG. 5 essentially corresponds to that of the receiver of FIG. 1, particularly the phase synchronization of the local clock pulse generator 9 also takes place only when the amplitude of the signal of half the clock frequency $f_b/2$ selected in the frequency selective circuit 13 is sufficiently large.

When the nonlinear element 22 has a purely quadratic output-versus-input characteristic the frequency selective circuit 23 may be omitted in the receiver according to FIG. 5. Furthermore, the signal to be applied to the control circuit 16 may, for example, alternatively be derived from the output of the nonlinear element 22 formed as a full-wave rectifier or from the output of the frequency selective circuit 23 instead of directly from the output of the frequency selective circuit 13 as is shown in FIG. 1 and FIG. 5.

The operation of the receiver according to the invention has been described in the foregoing for the case of a multilevel information signal being transmitted by using amplitude modulation. In addition, the steps according to the invention may also be used for the transmission of information pulse signals by using multiphase modulation, as will now be described with reference to FIG. 6, in which elements corresponding to those in FIG. 1 and FIG. 5 have the same reference numerals.

Figure 6:
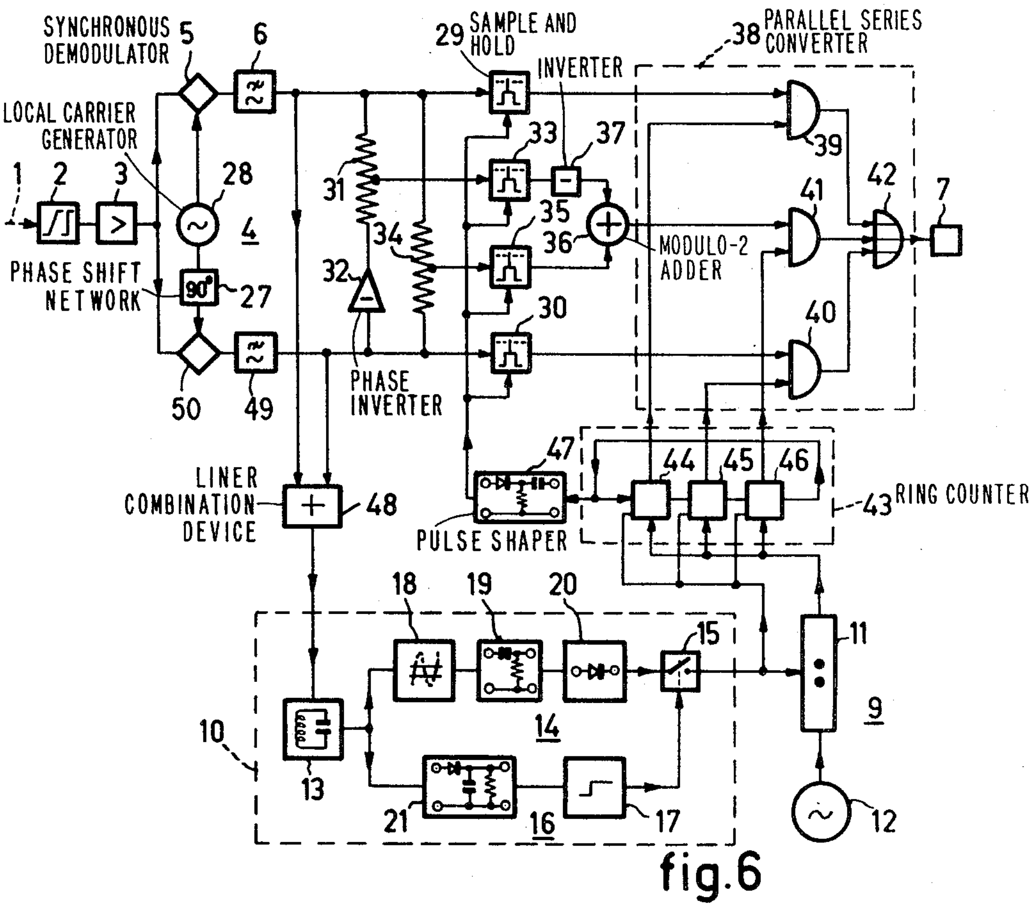
FIG. 6 shows a receiver according to the invention which is used for transmission by using eight-phase modulation, while a vector diagram is shown in FIG. 7 to explain the operation of the receiver of FIG. 6.

The receiver of FIG. 6 is adapted for receiving synchronous information pulse signals transmitted by using eight-phase modulation in which the original binary information pulse signals at a transmission speed of, for example, 2,400 Baud phase modulator a carrier oscillation at a frequency $f_c$ of, for example, 1.7 kHz. The phase modulated signal derived from the transmission path 1 and located in a transmission band of from 1.2—2.2 kHz. is applied through the equalizing network 2 and the input amplifier 3 to the detection device 4 which in the receiver shown has two parallel arranged channels each provided with synchronous demodulators 5', 5'', and succeeding low-pass filter 6', 6'' having a cutoff frequency of, for example 0.5 kHz. The two synchronous demodulators 5', 5'' are fed directly and through a 90° phase-shifting network 27 by a local carrier generator 28, for example, a stable oscillator, a four-level information pulse signal limited in bandwidth occuring at the output of each low-pass filter 6', 6'', and of which pulse signal the original information pulses occur in the rhythm of the clock frequency $f_b$=800 Hz. The local carrier generator 28 is accurately synchronized on the carrier frequency $f_c$ at the transmitter end, for example, by a pilot signal cotransmitted with the phase-modulated signal, or in different known manner.

With reference to the vector diagram shown in FIG. 7 it now will be described in what manner the original binary information pulse signals at a transmission speed of 2400 Baud are regained in the receiver of FIG. 6. The vector diagram shows eight successive sectors of 45° ("octants") in which the phase-modulated signal indicated by $r(t)$ derived from the transmission path 1 is located in the center of one of the octants at the sampling instants determined by the clock frequency $f_b$ when the local carrier generator 28 accurately corresponds in phase with the carrier oscillation of the frequency $f_c$ at the transmitter end. Each octant has been allotted a given combination of three successive information pulses A, B and C in the original bivalent information pulse signal, this combination ABC for the octants being shown in FIG. 7 by binary numbers. Four-level information pulse signals $a(t)$ and $b(t)$ are produced at the output of the low-pass filters 6', 6'' by the synchronous demodulation with two orthogonal carrier oscillation in the demodulators 5', 5'' which pulse signals are indicated as projections of the phase modulated signal $r(t)$ of that instant on the orthogonal carrier vectors having a phase of 0° and 90°, respectively.

To determine the values A and B, each signal $a(t)$ and $b(t)$ at the output of the low-pass filters 6', 6'' is applied to sample-and-hold circuits 29 and 30, respectively, which under the control of clock pulses from the local clock pulse generator 9 determine whether $a(t)$ and $b(t)$ are either positive or negative. The information pulse A of the binary value 1 occurs at the output of the sample-and-hold circuit 29 when $a(t)$ is positive, and that of the binary value 0 occurs when $a(t)$ is negative; likewise the information pulse B of the binary value 1 or 0 occurs at the output of the sample-and-hold circuit 30, dependent on whether $b(t)$ is either positive or negative. For determining the value C, the signal $a(t)-b(t)$ is formed on the one hand with the aid of a resistor 31 connected between the outputs of the low pass filters 6', 6'', to which resistor the signal $a(t)$ is directly applied and the signal $b(t)$ is applied through a phase inverter stage 32 for forming the signal $-b(t)$. The resistor 31 is branched exactly in the centre and the signal $a(t)-b(t)$ occurring at this center tapping is applied to a sample-and-hold circuit 33 which determines whether $a(t)-b(t)$ is either positive or negative. On the other hand the signal $a(t)+b(t)$ is also formed with the aid of a resistor 34 connected between the output of the low-pass filters 6', 6'' in which the signal $a(t)+b(t)$ occurs at the center tapping which signal is applied to a sample-and-hold circuit 35 to determine whether the signal $a(t)+b(t)$ is either positive or negative. It may be evident from the vector diagram in FIG. 7 that the information pulse C has the binary value 1 only when the signals $a(t)-b(t)$ and $a(t)+b(t)$ are either simultaneously positive or simultaneously negative, and in all other cases assumes the binary value 0. In the receiver shown the information pulse C is obtained by connecting the outputs of the two sample-and-hold circuits 33 and 35 to the inputs of a modulo-2-adder 36, an inverter 37 preceding one of the inputs of the modulo-2-adder 36.

The information pulses A, B and C thus obtained are now applied to a parallel series converter 38 in which the binary information pulses A, B, C occurring simultaneously in the rhythm of the clock frequency $f_b$=800 Hz. are converted into the original binary information pulse signal in which the information pulses A, B, C successively occur in the rhythm of the threefold clock frequency $3f_b$=2400 Hz., which original information pulse signal is passed on to the user 7. The parallel series converter 38 is formed in this case by three AND gates 39, 40, 41 one input of which is connected to the respective sample-and-hold circuits 29, 30 and the modulo-2-adder 36 and in which pulses of threefold clock frequency $3f_b$ are applied in cyclic alternation to the other input, while the output of the AND gates 39, 40 and 41 is connected through an OR gate 42 to the user 7.

The pulses of threefold clock frequency $3f_b$ for controlling the parallel series converter 38 are derived from the local clock pulse generator 9 as are the pulses of clock frequency $f_b$ for controlling the sample-and-hold circuits 29, 30, 33 and 35. To this end in the embodiment shown the stable oscillator 12 provides pulses at a frequency of $3\times64f_b$=153.6 kHz. which are divided in the divider 11 at a division factor of 64 so that pulses of a frequency of $3f_b$ are produced at the output of divider 11. These pulses of frequency $3f_b$ are applied as shift pulses to a ring counter 43 having three shift register elements 44, 45, 46, the output of the last shift register element 46 being connected to the input of the first shift register element 44. The condition of the shift register elements 44, 45, 46 is adjusted in such a manner that a pulse for controlling the parallel series converter 38 occurs always only at the output of one of the shift register elements. In order to ensure the correct phase relationship between the pulses of clock frequency $f_b$ and those of threefold clock frequency $3f_b$ during the parallel series conversion, the pulses of clock frequency $f_b$ are derived from the last shift register element 46 so that the ring counter 43 is also utilized as a divider having a division factor of 3. The pulses of clock frequency $f_b$ at the output of the ring counter 43 are applied to a pulse shaper 47 to obtain short pulses for controlling the sample-and-hold circuits 29, 30, 33, 35.

As in the receivers of FIG. 1 and FIG. 5 the clock frequency $f_b$ in the receiver of FIG. 6 is recovered with reliable phase from the received information pulse signals themselves by applying a multilevel information pulse signal derived from the detection device 4 to the clock frequency extractor 10 which has already been described extensively. In the embodiment shown the four-level information pulse signals $a(t)$ and $b(t)$ derived from the low-pass filters 6′, 6″ are both applied through a linear combination device 48 to the selective circuit 13 which is tuned to half the clock frequency $f_b/2$. Also in this case the phase synchronization takes place in the same manner as in the receiver of FIG. 1, the phase-synchronizing circuit of the local clock pulse generator 9 now comprising the two dividers 11 and 43 with the aid of which the clock frequency $f_b$ is obtained from the much higher frequency of the oscillator 12, and the synchronizing pulses of the clock frequency extractor 10 reset the two dividers 11, 43 to their initial position.

Figure 7:
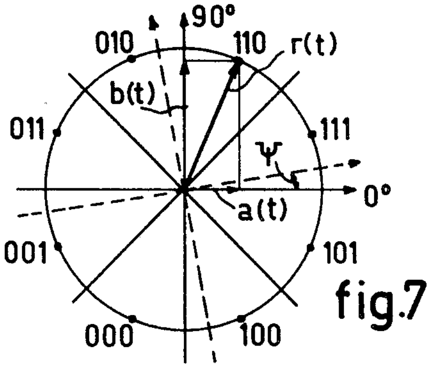

The phase synchronization of the local clock pulse generator 9 thus obtained is not only particularly accurate, but in contrast with the recovery of the information pulse signals—it is also entirely independent of phase deviations of the local carrier generator 28 relative to the carrier oscillation at the transmitter end as will be shown with reference to FIG. 7.

If the local carrier generator 28 has, for example, a phase deviation Ψ, crosstalk occurs between the signals at the output of the low-pass filter 6′, 6″, as may be apparent from FIG. 7, in which the phase-modulated signal $r(t)$ is not projected on the orthogonal carrier vectors of phase 0° and 90°, respectively, but on the carrier vectors of phase Ψ and 90°+Ψ, respectively, which are shifted in phase through an angle Ψ and are shown in broken lines, so that the signals $a(t)$ and $b(t)$ both contribute to the output signal of both the low-pass filter 6′ and the low-pass filter 6″. If the component of half the clock frequency $f_b/2$ (compare relation (5)) occurs in the signal $a(t)$ in the shape of:

$$s_a(t).\sin(\pi t/D) \quad (6)$$

and in the signal $b(t)$ in the shape of:

$$s_b(t).\sin(\pi t/D) \quad (7)$$

then it appears from FIG. 7 that in case of a phase deviation Ψ of the local carrier generator 28 this component of half the clock frequency $f_b/2$ at the output of low-pass filter 6′ occurs in the shape of:

$$[s_a(t)\cdot\cos\psi+s_b(t)\cdot\sin\psi]\cdot\sin(\pi t/D) \quad (8)$$

and at the output of low-pass filter 6″ in the shape of:

$$[s_b(t)\cdot\cos\psi-s_a(t)\cdot\sin\psi]\cdot\sin(\pi t/D) \quad (9)$$

and thus occurs in the signal applied to the selective circuit 13 in the shape of:

$$\{[s_a(t)+s_b(t)]\cdot\cos\psi+[s_b(t)-s_a(t)]\cdot\sin\psi\}\cdot\sin(\pi t/D) \quad (10)$$

It is evident from the relations (8), (9) and (10) that neither the variation of the information pulse signals $a(t)$ and $b(t)$ nor the phase deviations Ψ of the local carrier generator 28 have any influence at all on the location of the zero crossings of the signal of half the clock frequency $f_b/2$ selected with the aid of the selective circuit 13, provided that, as in the foregoing, the amplitude of this selected signal is sufficiently large.

The use of the steps described thus provides a particularly accurately and reliable phase synchronization of the local clock pulse generator 9 with the aid of the clock frequency recovered in its proper phase from the received information pulse signals themselves, and neither the variation of the information pulse signals nor the phase deviations of the local carrier generator 28 exert adverse influence on the obtained phase synchronization of the local clock pulse generator 9.

Instead of applying the two multilevel information pulse signals derived from the low-pass filter 6′, 6″ to the frequency selective circuit 13, it may alternatively suffice to apply one of the two, for example, the information pulse signal derived from low-pass filter 6′, and it follows from relation (8) that the previous consideration equally apply. Furthermore the receiver of FIG. 6 may alternatively be adapted for the reception of three separate binary information pulse signals each having a transmission speed of 800 Baud, and in which the clock pulses for these three information pulse signals must accurately correspond at the transmitter end, both as regards frequency and as regards phase. The three information pulse signals may then directly be derived from the output of the sample-and-hold circuit 29, the sample-and-hold circuit 39 and the module-2-adder, 36, respectively, while the parallel series converter 38 and the associated control may then be omitted.

Finally it is to be noted that instead of a local clock pulse generator or carrier generator of the free-running type, such as an oscillator, it is alternatively possible to use generators of the driven type in which, for example, the clock frequency $f_b$ or the carrier frequency $f_c$ is derived of a number of drive frequencies.

What we claim is:

1. A receiver for the reception of information pulse signals located in a prescribed transmission band, the original information pulses of which coincide with different pulses of a series of equidistant clock pulses, the receiver comprising a detection device for deriving a multilevel information pulse signal, a pulse regenerator controlled by a local clock pulse generator for regenerating the detected information pulses as to shape and instant of occurrence, and a clock frequency extractor for recovering the clock frequency signal from the multilevel signal derived from the detection device, and for applying the recovered clock frequency signal to a phase-synchronizing circuit of the local clock pulse generator, said extractor comprising a frequency selective circuit tuned to half the clock frequency, the input of the selective circuit connected to the output of the detection device, and the output of the selective circuit connected to a nonlinear circuit acting as a frequency doubler, the output of said nonlinear circuit connected to a normally open electronic switch to the phase-synchronizing circuit of the local clock pulse generator, a control circuit for controlling said electronic switch including a threshold device to which a signal derived from said frequency selective circuit is applied for producing a control signal for closing the electronic switch when said derived signal exceeds the threshold value of said threshold device.

2. A receiver as claimed in claim 1, characterized in that the nonlinear circuit is formed by a double-acting limiter connected to the frequency selective circuit and succeeded by a differentiating network for the limited selected signal of half the clock frequency, and a full-wave rectifier whose output is connected to the electronic switch.

3. A receiver as claimed in claim 1, characterized in that the nonlinear circuit is formed by a full-wave rectifier connected to the frequency selective circuit and succeeded by a further frequency selective circuit tuned to the clock frequency for selection of the signal which is frequency doubled in the rectifier whose output is connected to the electronic switch.

4. A receiver as claimed in claim 1, characterized in that an amplitude detector is incorporated in the control circuit preceding the threshold device.

5. A receiver as claimed in claim 1 adapted for the reception of information pulse signals transmitted by using multiphase modulation, and provided with synchronous demodulators fed by a local carrier generator, characterized in that the selective circuit is connected to at least one of the outputs of the synchronous demodulators.